(12) United States Patent
Yokoyama et al.

(10) Patent No.: US 11,970,171 B2
(45) Date of Patent: Apr. 30, 2024

(54) ROAD SURFACE CONDITION DETERMINATION DEVICE FOR VEHICLE, DRIVING ASSISTANCE SYSTEM, AND ROAD SURFACE CONDITION DETERMINATION METHOD

(71) Applicant: DENSO CORPORATION, Kariya (JP)

(72) Inventors: Takahisa Yokoyama, Kariya (JP); Noriyuki Ido, Kariya (JP)

(73) Assignee: DENSO CORPORATION, Kariya (JP)

( * ) Notice: Subject to any disclaimer, the term of this patent is extended or adjusted under 35 U.S.C. 154(b) by 299 days.

(21) Appl. No.: 17/483,650

(22) Filed: Sep. 23, 2021

(65) Prior Publication Data

US 2022/0009502 A1 Jan. 13, 2022

Related U.S. Application Data

(63) Continuation of application No. PCT/JP2020/004840, filed on Feb. 7, 2020.

(30) Foreign Application Priority Data

Mar. 25, 2019 (JP) .................................. 2019-056506

(51) Int. Cl.
*B60W 40/06* (2012.01)
*G06T 7/00* (2017.01)

(52) U.S. Cl.
CPC ............... *B60W 40/06* (2013.01); *G06T 7/00* (2013.01); *B60W 2420/42* (2013.01); *B60W 2420/52* (2013.01); *B60W 2552/35* (2020.02)

(58) Field of Classification Search
CPC ............. B60W 40/06; B60W 2552/35; B60W 2420/42; B60W 2420/52; G06T 7/00
See application file for complete search history.

(56) References Cited

U.S. PATENT DOCUMENTS

| | | | |
|---|---|---|---|
| 2009/0052742 | A1 | 2/2009 | Okamoto |
| 2009/0105921 | A1* | 4/2009 | Hanatsuka ......... B60G 17/0165 701/80 |
| 2011/0200199 | A1* | 8/2011 | Wakao ................... G01H 17/00 381/56 |
| 2013/0116972 | A1* | 5/2013 | Hanatsuka ............ B60W 40/06 702/167 |

FOREIGN PATENT DOCUMENTS

| | | |
|---|---|---|
| DE | 102016210056 A1 | 12/2017 |
| JP | 2006-107457 A | 4/2006 |
| JP | 2017-182139 A | 10/2017 |
| WO | 2005/075959 A1 | 8/2005 |

\* cited by examiner

*Primary Examiner* — Thai Q Tran
*Assistant Examiner* — Jose M Mesa
(74) *Attorney, Agent, or Firm* — MASCHOFF BRENNAN

(57) ABSTRACT

A road-surface state determination apparatus for a vehicle is provided. The road-surface state determination apparatus includes an acquiring unit and a control unit. The acquiring unit acquires, as a first detection signal, information on a changed pixel of which a luminance value changes based on an absolute displacement of a road-surface state or a relative displacement of the road-surface state relative to a moving vehicle. The control unit determines a type of the road-surface state using the first detection signal.

10 Claims, 7 Drawing Sheets

ROAD SURFACE CONDITION DETERMINATION DEVICE FOR VEHICLE, DRIVING ASSISTANCE SYSTEM, AND ROAD SURFACE CONDITION DETERMINATION METHOD

CROSS-REFERENCE TO RELATED APPLICATION

The present application is a continuation application of International Application No. PCT/JP2020/004840, filed on Feb. 7, 2020, which claims priority to Japanese Patent Application No. 2019-056506, filed on Mar. 25, 2019. The contents of these applications are incorporated herein by reference in their entirety.

BACKGROUND

Technical Field

The present disclosure relates to a determination technology for a vehicle regarding a road-surface state.

Related Art

A technology in which an environment surrounding a vehicle is detected using target detectors such as an imaging apparatus and a radar is proposed.

SUMMARY

One aspect of the present disclosure provides a road-surface state determination apparatus for a vehicle. The road-surface state determination apparatus according to the first aspect includes: an acquiring unit that acquires, as a first detection signal, information on a changed pixel of which a luminance value changes based on an absolute displacement of a road-surface state or a relative displacement of the road-surface state relative to a moving vehicle; and a control unit that determines the road-surface state using the first detection signal.

DESCRIPTION OF THE EMBODIMENTS

A technology in which an environment surrounding a vehicle is detected using target detectors such as an imaging apparatus and a radar is proposed (for example, JP-A-2017-182139).

However, determination of a road-surface state of a road on which a vehicle is moving is not considered. In addition, there is an issue in that typical detectors for identifying people and vehicles, and measuring distances, such as the imaging apparatus and the radar, cannot accurately determine the road-surface state of a road.

It is thus desired to provide accurate determination of a road-surface state of a road.

The present disclosure can be actualized according to aspects below.

A first exemplary embodiment of the present disclosure provides a road-surface state determination apparatus for a vehicle. The road-surface state determination apparatus according to the first aspect includes: an acquiring unit that acquires, as a first detection signal, information on a changed pixel of which a luminance value changes based on an absolute displacement of a road-surface state or a relative displacement of the road-surface state relative to a moving vehicle; and a control unit that determines the road-surface state using the first detection signal.

As a result of the road-surface state determination apparatus for a vehicle according to the first embodiment, the road-surface state of a road can be accurately determined.

A second exemplary embodiment of the present disclosure provides a road-surface state determination method. The road-surface state determination method according to the second aspect includes: acquiring, as a first detection signal, information on a changed pixel of which a luminance value changes based on an absolute displacement of a road-surface state or a relative displacement of the road-surface state relative to a vehicle; and determining a type of the road-surface state using the first detection signal.

As a result of the road-surface state determination method according to the second aspect, the road-surface state of a road can be accurately determined. Here, the present disclosure can also be actualized as a road-surface state determination program or a computer-readable recording medium in which a road-surface state determination program is recorded.

A road-surface state determination apparatus, a driving assistance system, and a road-surface state determination method for a vehicle of the present disclosure will hereinafter be described according to several embodiments.

First Embodiment

Figure 1:
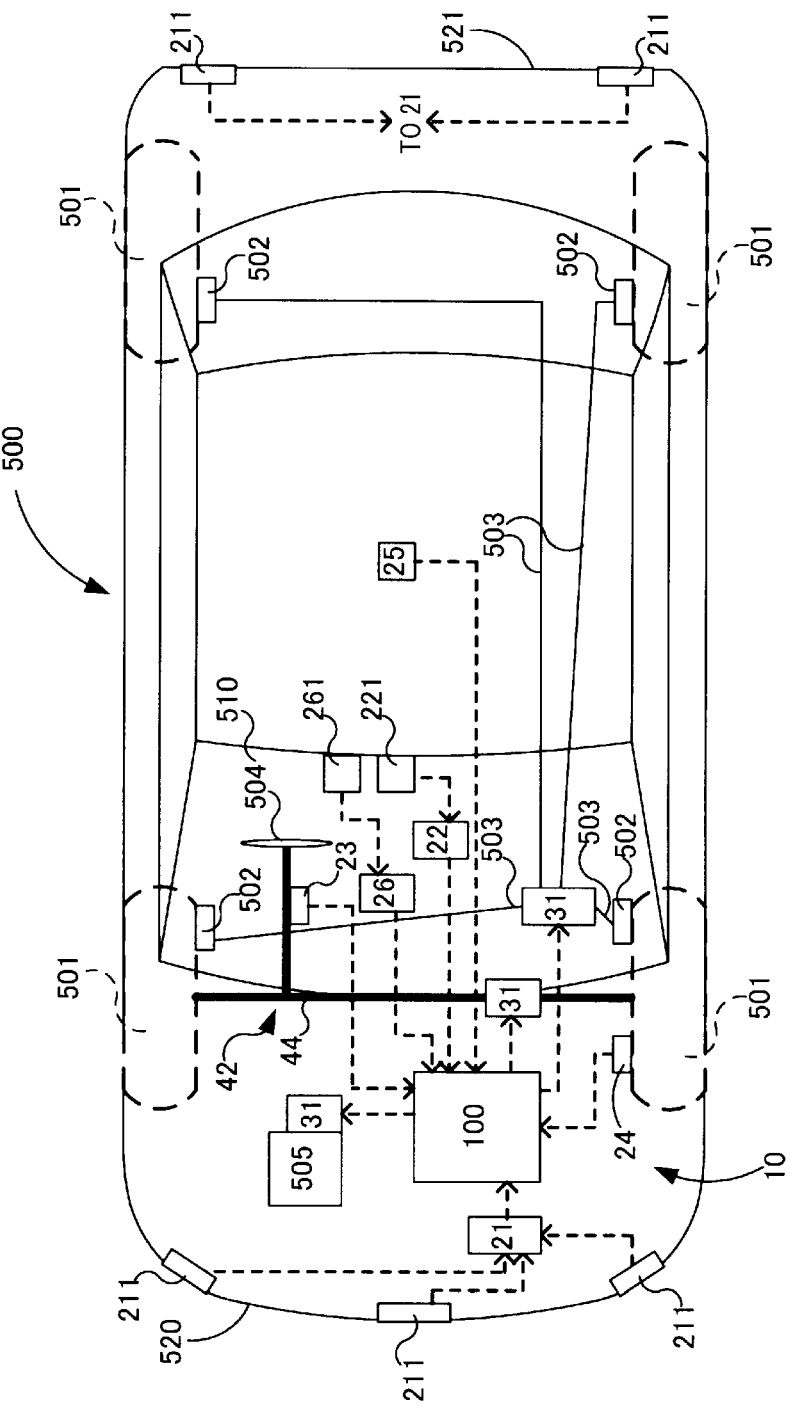
FIG. 1 is an explanatory diagram of an example of a vehicle in which a road-surface state determination apparatus and a driving assistance system according to a first embodiment are mounted.

As shown in FIG. 1, a road-surface state determination apparatus 100 of a vehicle according to a first embodiment is used so as to be mounted in a vehicle 500. The road-surface state determination apparatus 100 is merely required to include at least a control unit and an acquiring unit. A driving assistance system 10 includes, in addition to the road-surface state determination apparatus 100, a radar electronic control unit (ECU) 21, a millimeter-wave radar 211, a camera ECU 22, a camera 221, an event camera ECU 26, and an event camera 261 that serve as detectors, and a driving assistance execution apparatus 31.

Here, all that is required is that at least the camera ECU 22 and the camera 221 are provided in addition to the event camera ECU 26 and the event camera 261 as the detectors. The vehicle 500 according to the first embodiment further includes a rotation angle sensor 23, a wheel speed sensor 24, and a yaw rate sensor 25. The vehicle 500 also includes wheels 501, a brake apparatus 502, a brake line 503, a steering wheel 504, a front windshield 510, a front bumper 520, and a rear bumper 521. The vehicle 500 includes at least either of an internal combustion engine and an electric motor as a driving force source 505 for vehicle traveling.

The radar ECU 21 is connected to the millimeter-wave radar 211 that emits radio waves and detects reflected waves from a target. The radar ECU 21 generates a second detection signal that indicates the target by a detection point, that is, a reflection point using the reflected wave acquired by the millimeter-wave radar 211 and outputs the second detection signal.

The camera ECU 22 is connected to the single-lens camera 221. The camera ECU 22 identifies a target shape from a captured image that is acquired by the camera 221, generates a second detection signal that indicates a type of a target that is determined by a pattern matching process using a shape pattern of a target that is prepared in advance, and outputs the second detection signal. For example, identification of the target shape may be performed by semantic segmentation using machine learning. For example, pixel value information (R, G, B) and coordinate information that serves as positional information may be associated with pixels that are included in each frame of the captured image.

The radar ECU 21 and the millimeter-wave radar 211, and the camera ECU 22 and the camera 221 correspond to a second detector that acquires information on a target in a periphery of an own vehicle and outputs the information as the second detection signal.

The event camera ECU 26 is connected to the event camera 261 that is capable of acquiring changes in a luminance value of an object accompanying displacement of the object, in units of several μs. The event camera ECU 26 generates information on a changed pixel of which the change in luminance value based on displacement of the object is equal to or greater than a threshold that is prescribed in advance, and outputs the information as a first detection signal.

The event camera ECU 26 and the event camera 261 correspond to a first detector that acquires information on a changed pixel of which a value has changed based on an absolute displacement of a road-surface state or a relative displacement of a road-surface state relative to a vehicle that is moving, and outputs the information as the first detection signal. For example, the absolute displacement of the road-surface state may be a flow of rain water or a depth of water on a road surface in rainy weather. For example, the relative displacement of the road-surface state relative to the vehicle may be a displacement of visibility of unevenness of a road surface on a frozen road relative to a moving vehicle position.

Each of the ECUs 21, 22, and 26 is a microprocessor that includes a calculating unit, a storage unit, and an input/output unit. Here, the radar ECU 21 and the millimeter-wave radar 211 correspond to a detector for emitting detection waves and detecting reflected waves and reflection points, and typically measuring a distance between the own vehicle and a target. The radar ECU 21 and the millimeter-wave radar 211 detects a distance, a relative speed, and an angle of the target relative to the vehicle 500. As this detector, in addition to the millimeter-wave radar 211, a laser radar (LIDAR) or an ultrasonic wave detector that emits soundwaves and detects reflected waves thereof may be used.

The camera ECU 22 and the camera 221 are a detector that is capable of three-dimensionally recognizing the shape of a target. An imaging apparatus corresponds thereto. As the imaging apparatus, in addition to the camera 221, a three-dimensional (3D) LIDAR may be used. The camera 221 may be a stereo camera or a multi-camera that is configured by two or more cameras. As the event camera 261, in addition to an image sensor that does not output a detection signal that is composed of a frame group, an imaging apparatus that is capable of outputting a detection signal that is composed of a frame group that has a high frame rate, such as 1000 fps or greater, that is capable of detecting an absolute high-speed displacement such as a flow of water on a road surface or turbulence on a water surface, or a relative high-speed displacement of a road surface that accompanies traveling of a vehicle may be used.

The vehicle 500 includes the brake apparatus 502 for actualizing braking of the vehicle 500 and the steering wheel 504 for actualizing steering of the vehicle 500. The brake apparatus 502 is provided in each wheel 501. For example, each brake apparatus 502 may be a disk brake or a drum brake. The brake apparatus 502 actualizes braking of the vehicle 500 by braking the wheel 501 by braking force that is based on brake fluid pressure that is supplied through the brake line 503 based on a brake pedal operation by a driver. The brake line 503 includes a brake piston that generates the brake fluid pressure based on the brake pedal operation and a brake fluid line.

Here, a configuration in which, instead of the brake fluid line, a control signal line is used as the brake line 503 and an actuator that is provided in each brake apparatus 502 is operated may be used. The steering wheel 504 is connected to the wheel 501 on a front side with a steering apparatus 42 therebetween. The steering apparatus 42 includes a steering rod, a steering mechanism, and a steering shaft 44.

Figure 2:
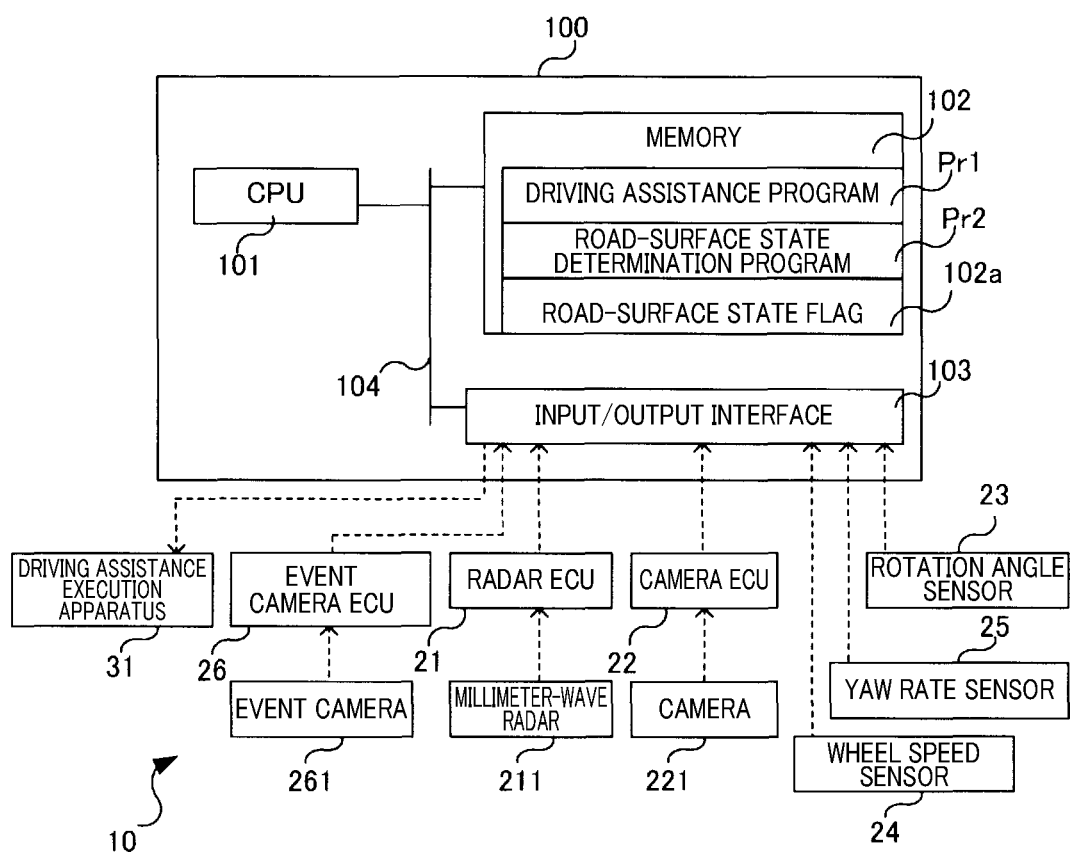
FIG. 2 is a block diagram of a functional configuration of the road-surface state determination apparatus according to the first embodiment.

As shown in FIG. 2, the road-surface state determination apparatus 100 includes a central processing unit (CPU) 101, a memory 102, an input/output interface 103, and a bus 104. The CPU 101 serves as a control unit. The input/output interface 103 serves as an acquiring unit. The CPU 101, the memory 102, and the input/output interface 103 are connected by the bus 104 so as to be capable of two-way communication. The memory 102 includes a memory, such as a read-only memory (ROM), that stores therein a driving assistance program Pr1 and a road-surface state determination program Pr2 in a non-volatile and read-only manner, and a memory, such as a random access memory (RAM), that is readable and writable by the CPU 101 and has a road-surface state flag storage area 102a.

The driving assistance program Pr1 is for performing driving assistance of the own vehicle. The road-surface state determination program Pr2 is for determining a road-surface state using detection results of the event camera 261. The CPU 101 opens and runs the driving assistance program Pr1 and the road-surface state determination program Pr2 that are stored in the memory 102 in a readable and writable memory. The CPU 101 thereby actualizes functions as the control unit. Here, the CPU 101 may be a single CPU. Alternatively, the CPU 101 may be a plurality of CPUs that run each program. Alternatively, the CPU 101 may be a multi-core-type CPU that is capable of simultaneously running a plurality of programs.

The radar ECU 21, the camera ECU 22, the event camera ECU 26, the rotation angle sensor 23, the wheel speed sensor 24, the yaw rate sensor 25, and the driving assistance apparatus 31 are each connected to the input/output interface 103 by a control signal line. Detection signals are inputted from the radar ECU 21, the camera ECU 22, the event camera ECU 26, the rotation angle sensor 23, the wheel speed sensor 24, and the yaw rate sensor 25. A control signal that specifies driving force based on a required torque, a control signal that specifies a brake level, and a control signal that specifies a steering angle are outputted to the driving assistance apparatus 31. Therefore, the input/output interface 103 functions as an acquiring unit for acquiring detection signals that are detected by various sensors, including the first detection signal and the second detection signal.

The millimeter-wave radar 211 is a sensor that emits millimeter waves and receives reflected waves reflected by a target. According to the present embodiment, the millimeter-wave radar 211 is arranged in the front bumper 520 and the rear bumper 521. An unprocessed detection signal that is outputted from the millimeter-wave radar 21 is processed by the radar ECU 21 and inputted to the road-surface state determination apparatus 100 as a detection signal that is composed of a detection point or a series of detection points that indicates a single or a plurality of representative positions of a target. Alternatively, the radar ECU 21 may not be provided, and a signal that indicates an unprocessed reception wave may be inputted as a detection signal from the millimeter-wave radar 211 to the driving assistance control apparatus 100. In cases in which the unprocessed reception wave is used as the detection signal, the road-surface state determination apparatus 100 performs signal processing to identify a position and a distance of the target.

The camera 221 is an imaging apparatus that includes a single image sensor, such as a charge-coupled device (CCD), or a single image sensor array. The camera 221 is a sensor that outputs, as image data that is a detection result, outer appearance information or shape information on a target by receiving visible light. The camera ECU 22 performs the above-described process on the image data that is captured by the camera 221, and the second detection signal that indicates the type of the target is generated.

Unprocessed image data that is captured by the camera 221 may be inputted to the road-surface state detection apparatus 100 as the second detection signal. In this case, the road-surface state determination apparatus 100 performs a segmentation process for the target and a determination process for type. According to the present embodiment, the camera 221 is arranged in a center of an upper portion of the front windshield 510. The image data that is outputted from the camera 221 may be monochrome pixel data. In this case, the luminance value is used in segmentation.

The event camera 261 is an event-detection-type image sensor that has a plurality of pixels that are configured by a single image sensor and is capable of detecting, in units of several μs, an event that is changes in a luminance value of an object that occurs in accompaniment with displacement of the object. The event camera 261 outputs, as a detection result, information on a changed pixel that corresponds to a position at which the luminance value has changed in the object, such as a reception light intensity or pixel coordinates, and does not output detection results in frame units that are acquired by all of the plurality of pixels being scanned.

Therefore, as a result of the detection result of the event camera 261 being used, the absolute displacement of the road surface or the relative displacement of the road surface relative to traveling of the vehicle can be extracted, and the road-surface state can be determined. According to the present embodiment, the event camera ECU 26 generates information that includes the position coordinates and luminance values related to changed pixels of which the detected change in luminance value is equal to or greater than a threshold prescribed in advance, that is, information indicating the absolute displacement or the relative displacement of the road-surface state, and outputs the information as the first detection signal.

The event camera 261 is merely required to be capable of outputting the information on the changed pixel of which a value has changed based on displacement of an object. In addition to the image sensor that does not output a detection signal that is composed of a frame group, an imaging apparatus that is capable of outputting a detection signal that is composed of a frame group at the above-described high frame rate may also be used.

The rotation angle sensor 23 is a torque sensor that detects an amount of torsion, that is, a steering torque that is generated in the steering rod as a result of steering of the steering wheel 504 as a voltage value that is proportional to the amount of torsion. The rotation angle sensor 23 detects the steering angle of the steering wheel 504. According to the present embodiment, the rotation angle sensor 23 is provided in the steering rod that connects the steering wheel 504 and the steering mechanism.

The wheel speed sensor 24 is a sensor that detects a rotation speed of the wheel 501. The wheel speed sensor 24 is provided in each wheel 501. The detection signal that is outputted from the wheel speed sensor 24 is a voltage value that is proportional to the wheel speed or a pulse wave that indicates an interval that is based on the wheel speed. Information such as vehicle speed and traveling distance of the vehicle can be acquired through use of the detection signal from the wheel speed sensor 24.

The yaw rate sensor 25 is a sensor that detects a rotational angular velocity of the vehicle 500. For example, the yaw rate sensor 25 may be arranged in a center portion of the vehicle. The detection signal that is outputted from the yaw rate sensor 25 is a voltage value that is proportional to a rotation direction and an angular velocity.

The driving assistance execution apparatus 31 controls increase and decrease in an output of the driving force source 505 based on an accelerator pedal operation by the driver or regardless of the accelerator pedal operation by the driver. The driving assistance execution apparatus 31 actualizes braking by the brake apparatus 502 regardless of the brake pedal operation by the driver or actualizes steering by the steering apparatus 42 regardless of the operation of the steering wheel 504 by the driver.

Figure 3:
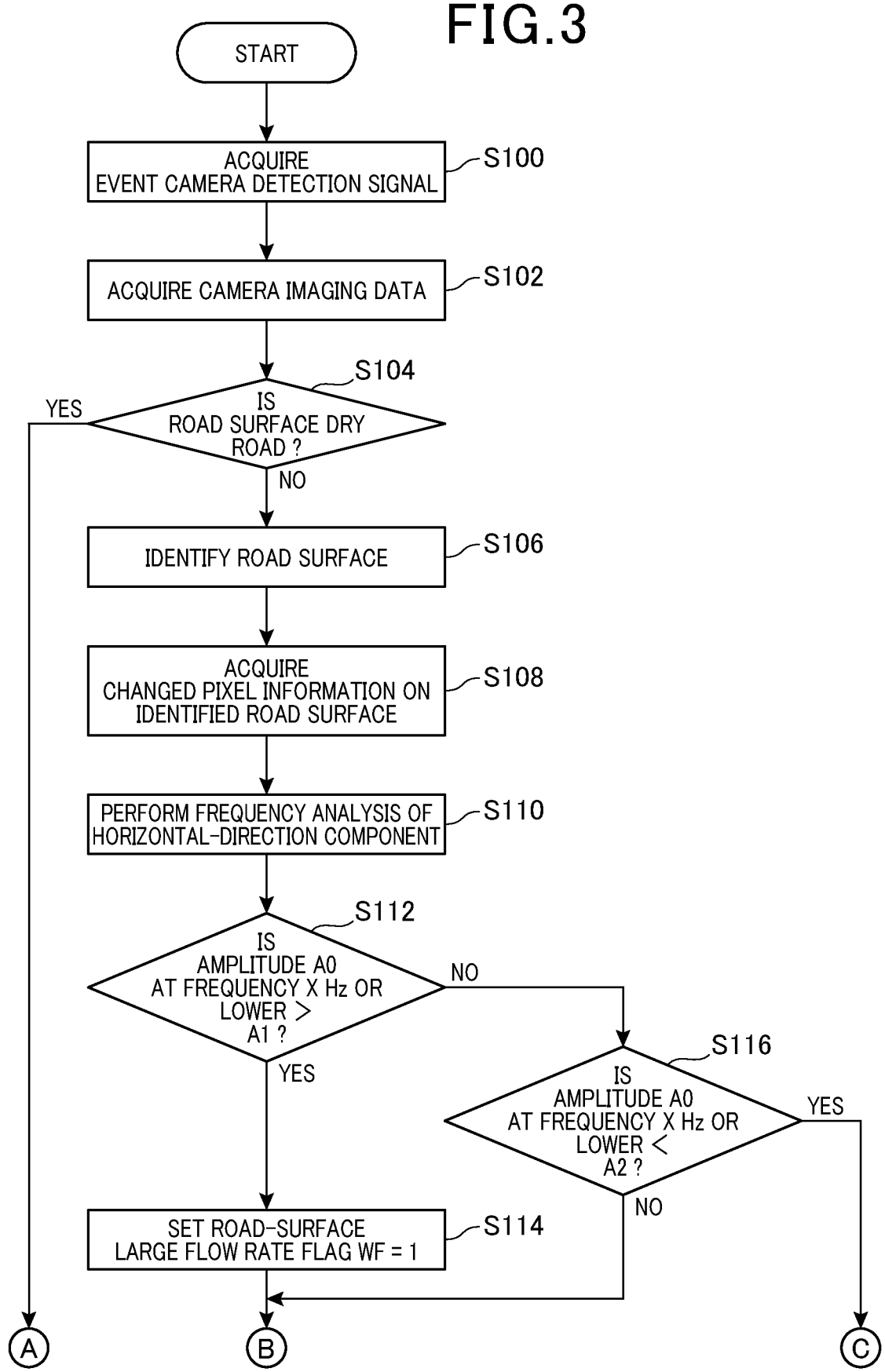
FIG. 3 is a flowchart of a processing flow of a road-surface state determination process performed by the road-surface state determination apparatus according to the first embodiment.
Figure 4:
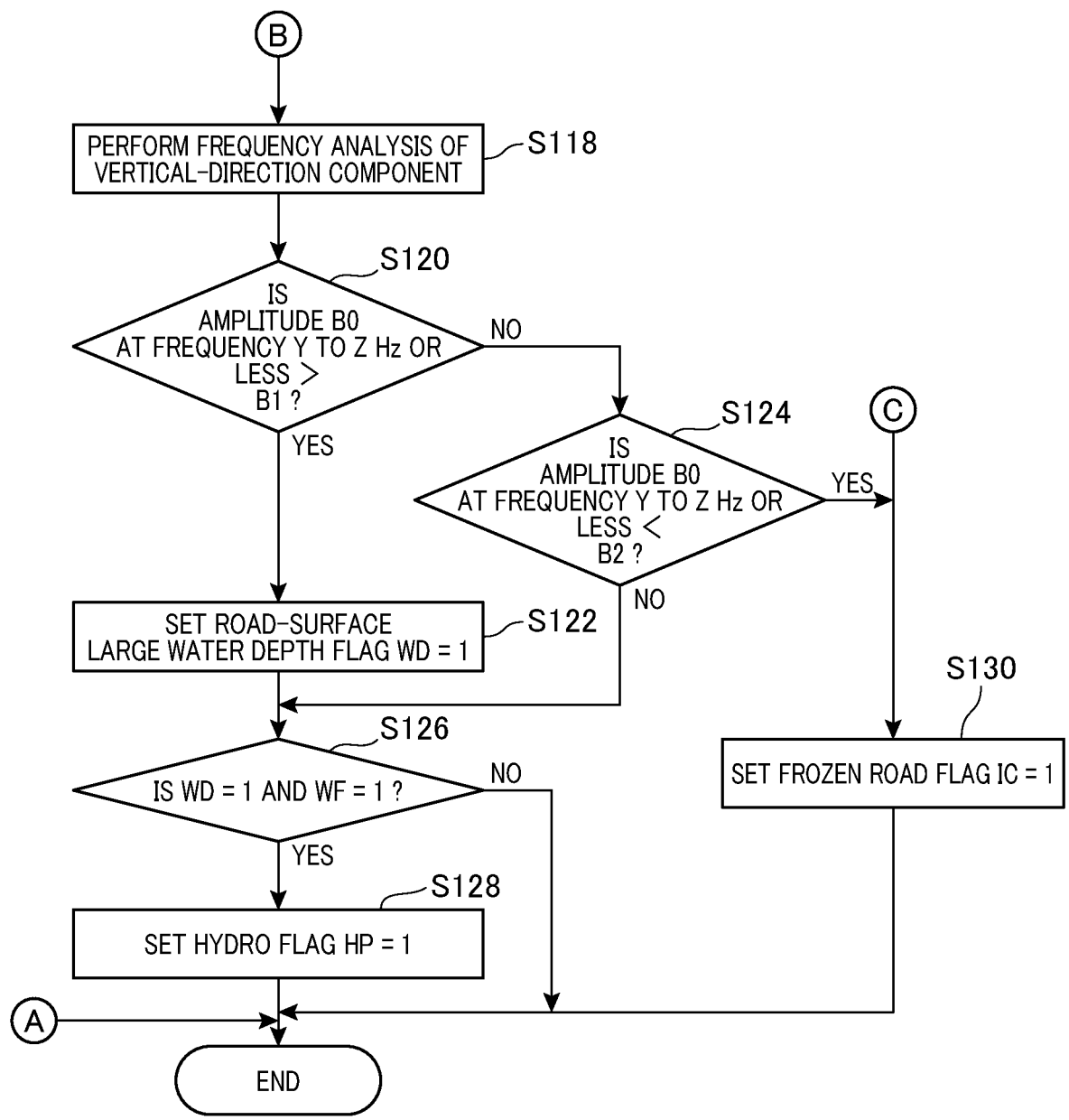
FIG. 4 is a flowchart of a processing flow of the road-surface state determination process performed by the road-surface state determination apparatus according to the first embodiment.

A road-surface state determination process performed by the road-surface state determination apparatus 100 according to the first embodiment will be described. For example, processing routines shown in FIG. 3 and FIG. 4 may be repeatedly performed at a predetermined time interval, such as μs order, from start to stop of a control system of the vehicle or from when a start switch is turned on until the start switch is turned off. The road-surface state determination process shown in FIG. 3 and FIG. 4 is performed by the CPU 101 running the road-surface state determination program Pr2.

The CPU 101 acquires the event camera detection signal that is the first detection signal through the input/output interface 103 (step S100). Specifically, the CPU 101 receives the first detection signals outputted from the event camera ECU 26 over time, and acquires information on a single or a plurality of changed pixels of which the luminance value detected by the event camera 261 has changed. The first detection signal includes information on a plurality of changed pixel groups that indicate an absolute displacement attributed to behavior of an object itself, such as a flow of water on a road surface, or rolling and wavering of a water surface, or a relative displacement of a road-surface shape that is attributed to the vehicle, such as unevenness of a frozen surface relative to a moving vehicle.

The CPU 101 acquires peripheral information, that is, the second detection signal (step S102). For example, the peripheral information may be information that indicates the state of the road surface that is extracted from a captured image that is an imaging result that indicates the road-surface state captured by the camera 221. The CPU 101 determines whether the road surface of a planned trajectory of the own vehicle is a dry road that is not wet using the acquired peripheral information (step S104).

The CPU 101 determines that the road surface is a dry road when a degree of whiteness of a road-surface corresponding area that is included in the captured image is higher than a dry road determination value that is prescribed in advance. That is, a wet road that is a wet road surface has stronger blackness than the dry road. Therefore, the determination as to whether the road surface is dry or wet can be performed based on the degree of whiteness.

Here, the peripheral information may be a captured image that is in grayscale or a color captured image that is converted to grayscale. The degree of whiteness can be considered to be a degree of brightness or a degree of luminance. When determined that the type of the road-surface state indicates a dry road (YES at step S104), the CPU 101 advances to A in FIG. 4 and ends the present processing routine.

Here, the determination as to whether the road surface of the planned trajectory of the own vehicle is the dry road that is not wet may not be performed. In addition, instead of the second detection signal, a rainfall or a snowfall state may be determined when an operation signal of a windshield wiper is on, and the road surface may be determined not to be the dry road, or a likelihood of a frozen road may be determined when an external temperature is equal to or lower than a temperature that is prescribed in advance, such as 4° C., and the road surface may be determined not to be a dry road.

When determined that the road-surface state being the dry road is not indicated (No at step S104), the CPU 101 identifies the road surface of which the road-surface state is to be further determined using the first detection signal that is acquired from the event camera 261. The determination that the road-surface state is not a dry road includes a case in which a wet region is present in a portion of the road surface and a case in which wet regions are present in a scattered manner.

Figure 6:
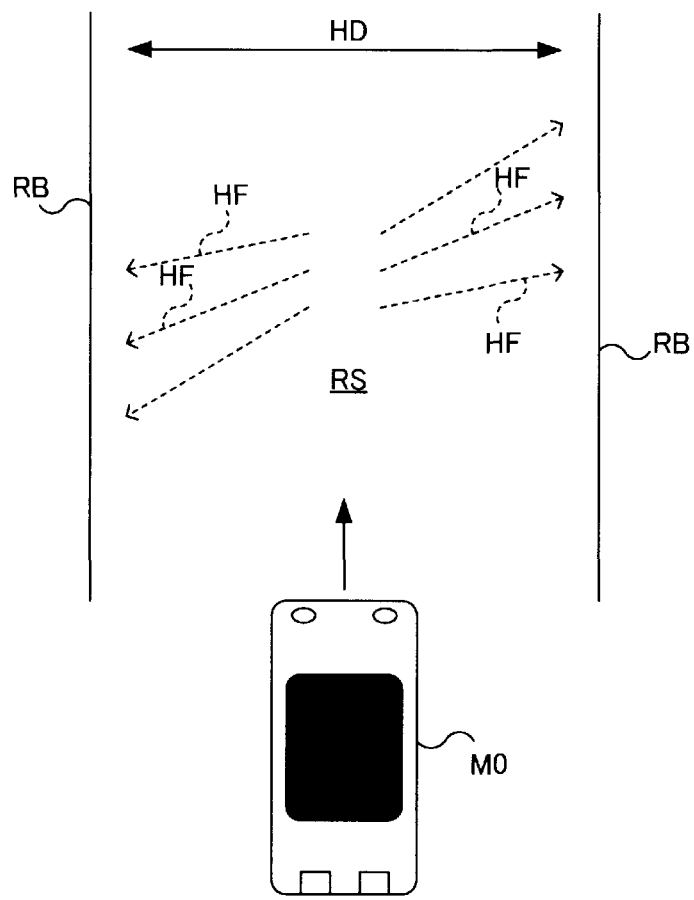
FIG. 6 is an explanatory diagram schematically showing an example of a road boundary and water current in a horizontal direction, in which a road is viewed from above.
Figure 7:
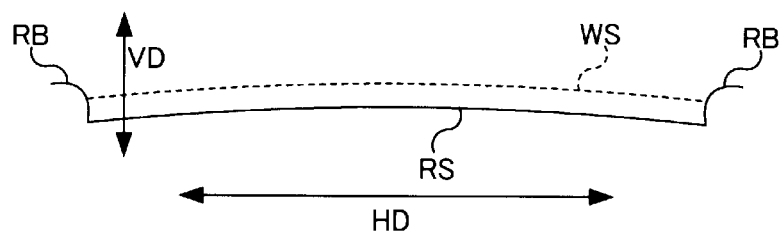
FIG. 7 is an explanatory diagram schematically showing an example of a road boundary and water surface in a vertical direction, in which the road is viewed from the vehicle.

For example, as shown in FIG. 6 and FIG. 7, the identification of the road surface may be performed by a road boundary line RB being identified using the second detection signal, and an area that is surrounded by the road boundary lines RB, that is, an area that is sandwiched between the road boundary lines RB being determined to be an identified road surface RS.

Alternatively, a wet region that is a partial area of the road surface that is identified using the captured image may be identified as the identified road surface RS, or an area in which a change pixel is present or a change pixel is included in the first detection signal that is acquired by the event camera 261 may be identified as the identified road surface RS. That is, the identified road surface RS is not limited to the overall road surface, and may be a portion of the road surface, such as a wet area or a partial area of a wet road in which a water depth or flow differs from that of other areas. The identified road surface RS may also be a plurality of areas in which these areas are scattered. Furthermore, a vicinity of a tire of another vehicle such as a leading vehicle or an oncoming vehicle may be identified as the identified road surface RS.

The CPU 101 acquires changed pixel information on the identified road surface RS that is included in the first detection signal, that is, information on a changed pixel group that indicates at least either of the absolute displacement and the relative displacement of the identified road surface RS that is acquired by the event camera 261 (step S108). When the information on the changed pixel is acquired, information acquisition may be performed mainly regarding the vicinity of a tire of another vehicle such as a leading vehicle or an oncoming vehicle. This is because an absolute displacement of the road-surface state on a wet road is prominent in the vicinity of a tire.

Here, identification of a tire vicinity area may be performed using the first detection signal or may be performed using the capture image acquired by the camera 221. The CPU 101 extracts a displacement component in a horizontal direction HD from the acquired displacement of the changed pixel group, and performs frequency analysis on displacement characteristics in the horizontal direction HD (step S110). Here, the horizontal direction HD means a width direction of an own vehicle M0 shown in FIG. 6 or a direction that is parallel to the road surface. A water current HF that flows in the horizontal direction is generated on the identified road surface RS as a result of rainfall. In particular, the water current HF is more easily generated on a road that is sloped such that a road shoulder or a drain outlet is lower.

In addition, a water current that has a high wave height may be generated by a tire of the leading vehicle. The displacement component in the horizontal direction includes displacement components in the horizontal direction that are changes in luminance that correspond to the water current HF, that is, various speed components thereof. The frequency analysis is performed by a fast Fourier transform (FFT) being performed on the extracted displacement component in the horizontal direction. Here, the frequency analysis may be performed using a band filter.

The CPU 101 determines whether an amplitude A0 at a first frequency X Hz or lower in a result of the frequency analysis is greater than a first amplitude A1, that is, whether A0>A1 (step S112). For example, the amplitude A0 may be an average value, a maximum value, or a median value of the amplitude at the first frequency X Hz or lower. For example, the frequency X may be 1 Hz that corresponds to a frequency of the water current HF that has a large flow rate, that is, a fast flow. For example, the amplitude A1 may be 10 cm that corresponds to a change in a water surface height of the water current HF that has a large flow rate.

Here, the frequency X and the amplitude A1 are merely examples. Appropriate values can be used based on the characteristics of the subject water current HF. When determined that A0>A1 (Yes at step S112), the CPU 101 determines that the type of the road-surface state is a wet road that has a large flow rate. The CPU 101 turns on a road-surface large flow rate flag WF in the road-surface state flag storage area 102a, that is, sets the road-surface large flow rate flag WF=1 (step S114), and proceeds to B in FIG. 4.

When determined that A0 is not >A1 (No at step S112), the CPU 101 determines whether the amplitude A0 at the first frequency X Hz or lower is less than a second amplitude A2, that is, whether A0<A2 (step S116). For example, the amplitude A2 may be 1 cm that corresponds to a change in the water surface height of the water current HF that has a small flow rate. Here, instead of the first frequency X Hz, a lower frequency that corresponds to the water current HF that has a small flow rate may be used.

When determined that A0 is not <A2 (No at step S116), the CPU 101 determines that the road surface is a wet road that has a small amount of water and proceeds to B in FIG. 4. When determined that A0<A2 (Yes at step S116), the CPU 101 proceeds to C in FIG. 4 and determines that the type of the road-surface state is a frozen road. The CPU 101 turns on a frozen road flag IC in the road-state flag storage area 102a, that is, sets the frozen road flag IC=1 (step S130) and ends the present processing routine.

After B in FIG. 4, the CPU 101 extracts a displacement component in a vertical direction VD from the displacement of the changed pixel group that is included in the acquired changed pixel information on the identified road surface RA included in the first detection signal, and performs frequency analysis on displacement characteristics in the vertical direction VD (step S118). Here, the vertical direction VD means a height direction of the own vehicle M0 in FIG. 7 or a direction VD that is perpendicular to the road surface. A water flow layer or a flood water layer that covers the identified road surface RS is generated in the vertical direction VD on the identified road surface RS as a result of rainfall. The displacement component in the vertical direction includes displacement components of various heights of a water surface WS that are changes in luminance that correspond to a depth of the flowing water layer, that is, a speed component. The frequency analysis is performed by the FFT being performed on the extracted displacement component in the vertical direction.

The CPU 101 determines whether an amplitude B0 at a second frequency Y to Z Hz or lower in a result of the frequency analysis is greater than a third amplitude B1, that is, whether B0>B1 (step S120).

For example, the amplitude B0 may be an average value, a maximum value, or a median value of the amplitude at the second frequency Y to Z Hz or lower. For example, the frequency Y to Z may be 0.1 to 3 Hz that corresponds to a frequency of the water surface WS of a flood water layer that has a slow flow or a flowing water layer that has a fast flow. For example, the amplitude B1 may be 1 cm that corresponds to a change in the height of the water surface WS of a flooded road. The water surface of a flood water layer that has a deep water depth is typically calm and has a low wave height. Here, instead of the second frequency range Y to Z Hz, only Y Hz or Z Hz may be used. The frequency Y to Z Hz and the amplitude B1 are merely examples. Appropriate values can be used based on the characteristics of the subject flood water layer or water flow layer on the flooded road.

When determined that B0>B1 (Yes at step S120), the CPU 101 determines that the type of the road-surface state is a wet road that is in a flooded state in which the water depth of the flood water layer or the flowing water layer covering the identified road surface RS is deep and affects traveling of the vehicle. The CPU 101 turns on a road-surface deep water flag WD in the road-surface state flag storage area 102a, that is, sets the road-surface deep water flag WD=1 (step S122).

When determined that B0 is not >B1 (No at step S120), the CPU 101 determines whether the amplitude B0 at the second frequency Y to Z Hz or lower is less than a fourth amplitude B2, that is, whether B0<B2 (step S124). For example, the amplitude B2 may be 0.5 cm that corresponds to a change in the height of the water surface WS of a shallow flowing water layer. Here, instead of the second frequency Y to Z Hz, a lower frequency that corresponds to a shallow flowing water layer may be used.

When determined that B0 is not <B2 (No at step S124), the CPU 101 determines that the type of the road-surface state is a wet road that has shallow water flow layer and proceeds to step S128. When determined that B0<B2 (Yes at step S124), the CPU 101 determines that the type of the road-surface state is a frozen road. The CPU 101 turns on the frozen road flag IC in the road-state flag storage area 102a, that is, sets the frozen road flag IC=1 (step S130) and ends the present processing routine.

The CPU 101 determines whether the road-surface large flow rate flag WF=1 and the road-surface deep water flag WD=1 (step S126). When determined that the road-surface large flow rate flag WF=1 and the road-surface deep water flag WD=1 (Yes at step S126), the CPU 101 determines that the type of the road-surface state is a wet road that is in a state in which hydroplaning may occur. The CPU 101 turns on a hydro flag HP in the road-surface state flag storage area 102a, that is, sets the hydro flag HP=1 (step S128) and ends the present processing routine. When determined that the road-surface large flow rate flag WF=1 and the road-surface deep water flag WD is not 1 (No at step S126), the CPU 101 ends the present processing routine.

Figure 5:
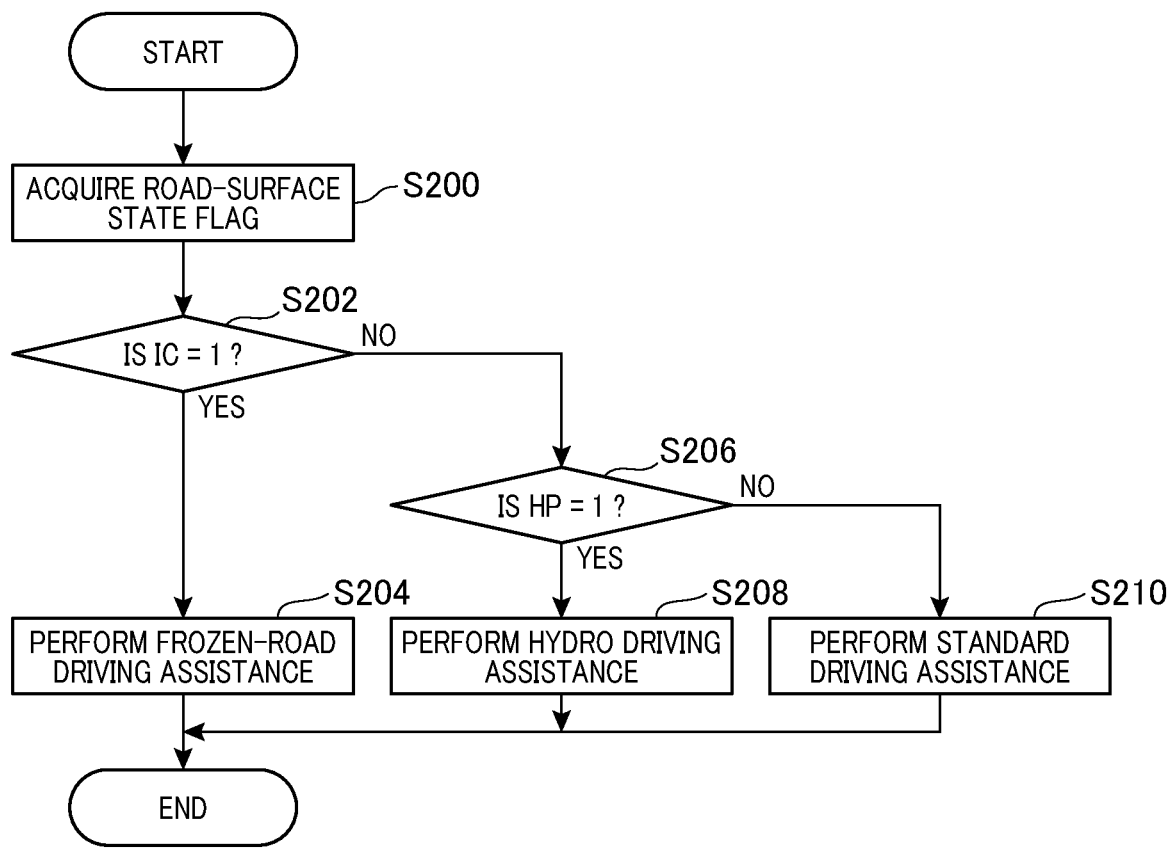
FIG. 5 is a flowchart of a processing flow of a driving assistance process performed by the driving assistance system according to the first embodiment.

Execution of a driving assistance process performed by the driving assistance system 10 will be described with reference to FIG. 5. For example, processing routines shown in FIG. 5 may be repeatedly performed at a predetermined time interval, such as several µs, from start to stop of the control system of the vehicle or from when the start switch is turned on until the start switch is turned off. The driving assistance process shown in FIG. 5 is performed by the CPU 101 running the driving assistance program Pr1. The CPU 101 acquires the road-surface state flag from the road-surface state flag storage area 102a (step S200). The CPU 101 determines whether the frozen road flag IC=1 (step S202). When the frozen road flag IC=1 (Yes at step S202), the CPU 101 performs frozen-road driving assistance (step S204) and ends the present processing routine.

Here, the frozen-road driving assistance being performed means both of a driving assistance mode being set to the frozen-road driving assistance, and the driving assistance mode being set to the frozen-road driving assistance and the driving assistance being performed through the driving assistance execution apparatus 31. For example, as the frozen-road driving assistance, driving assistance such as a braking start timing of emergency braking being made earlier, that is, a collision margin time (time-to-collision [TTC]) being increased, the brake line being pressurized in advance, rising of the braking force being slowed, and vehicle speed being reduced and inter-vehicle distance being increased in controlled constant-speed traveling and inter-vehicle distance control, that is, adaptive cruise control (ACC) can be performed.

When the frozen road flag IC is not 1 (No at step S202), the CPU 101 determines whether the hydro flag HP=1 (step S206). When the hydro flag HP=1 (Yes at step S206), the CPU 101 performs hydro driving assistance (step S208) and ends the present processing routine. For example, as the hydro driving assistance, driving assistance such as the brake line being pressurized in advance and deceleration being slowed, rising of the braking force being slowed, lane change to a traveling lane in which the water depth is lower being performed, and acceleration being restricted can be performed.

When the hydro flag HP is not 1 (No at step S206), the CPU 101 performs standard driving assistance (step S210) and ends the present processing routine. The standard driving assistance is a driving assistance process in which, on a dry road, collision with an obstacle on the road is prevented or damage due to collision is reduced. A driving assistance process such as braking assistance and steering assistance using TTC or acceleration restriction is included.

As a result of the road-surface state determination apparatus 100 according to the first embodiment described above, the type of the road-surface state can be determined using the information on the changed pixel of which the luminance value changes based on the absolute displacement of the road-surface state. Therefore, the road-surface state of the road can be accurately determined. That is, as a result of displacement such as a magnitude of a water current or a depth of water depth on a road surface that indicates the absolute displacement of the road-surface state being determined through use of the detection result of the event camera 261, for example, that is capable of detecting the water current that flows over the road surface and the water depth on the road surface at a high resolution as changes in the luminance value, the road-surface state can be accurately determined. Furthermore, the determination as to whether the road-surface state is a wet road or a frozen road can be performed.

As a result of the driving assistance system 100 that includes the road-surface state determination apparatus 100 according to the first embodiment, the frozen-road driving assistance is performed when the road-surface state that is determined is a frozen road, the hydro driving assistance is performed when the road-surface state is a flooded road and a likelihood of hydroplaning is present, and the standard driving assistance is performed when the road-surface state is a dry road. Therefore, driving assistance based on the road state can be performed. Effectiveness of driving assistance can be improved.

Other Embodiments (1) The determination as to whether the road-surface state is a frozen road may be performed by unevenness of the road surface being determined. That is, whereas a water surface has a smooth planar surface or a smooth spherical surface as a result of surface tension, a frozen surface has a surface that is unsmooth and uneven as a result of ice particles. Therefore, the determination as to whether the road-surface state is a frozen road may be performed using information on a changed pixel of which the luminance value changes based on a relative displacement of the road-surface state relative to the moving vehicle, in addition to the absolute displacement of the road-surface state or without use of the absolute displacement of the road-surface state.

Figure 8:
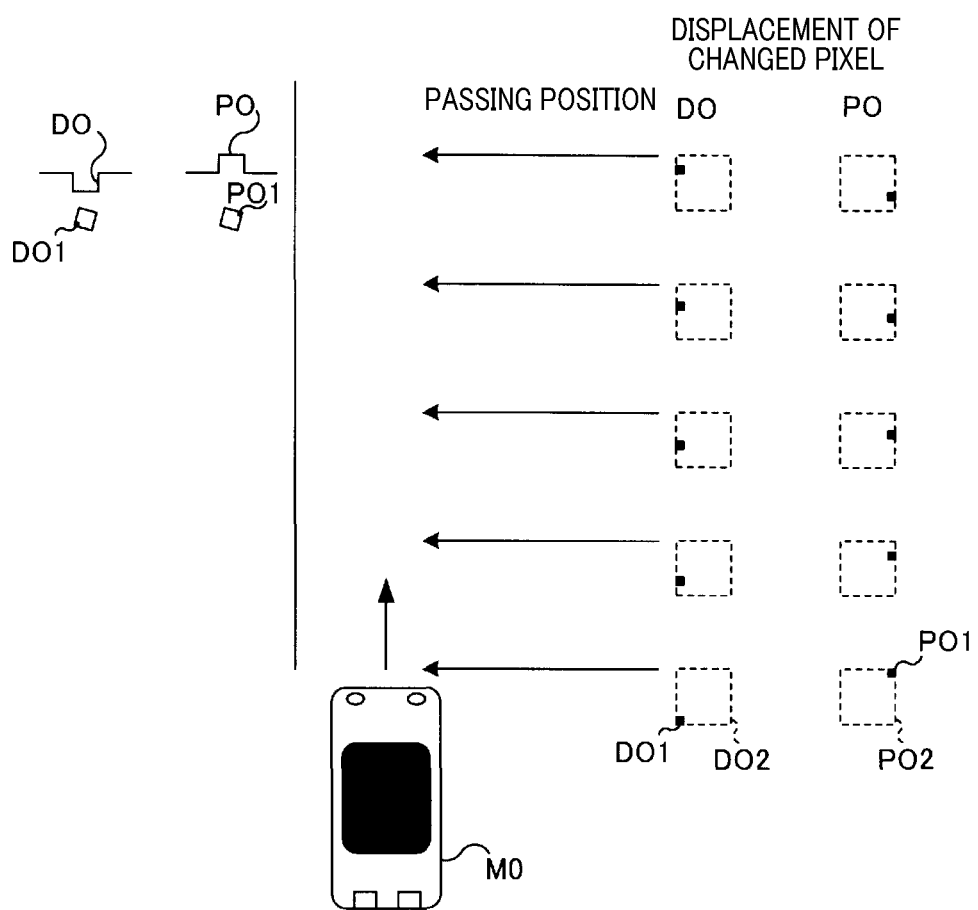
FIG. 8 is an explanatory diagram schematically showing visibility of unevenness of a road surface in accompaniment with moving of the vehicle.

As shown in FIG. 8, recessing portions DO and protruding portions PO are present. As shown in FIG. 8, when positions of changed pixels DO1 and PO1 that correspond to targets DO and PO move away from the own vehicle M0 as the own vehicle M0 moves, that is, in the case of the changed pixel PO1 that corresponds to one outer edge of the protruding portion PO, the road surface can be determined to be a protruding road surface.

When the positions of the changed pixels DO1 and PO1 that correspond to the targets DO and PO move closer to the own vehicle M0 as the own vehicle M0 moves, that is, in the case of the changed pixel DO1 that corresponds to one inner edge of the recessing portion DO, the road surface can be determined to be a recessing road surface. The outer edge and the inner edge correspond to luminance boundary lines that are formed by sunlight or front headlights.

Here, displacement of the changed pixels DO1 and PO1 in FIG. 8 schematically shows displacement that is observed when the own vehicle M0 passes each position that is indicated by an arrow on a right side of the targets DO and PO. In actuality, the positions of the changed pixels DO1 and PO1 are displaced as a result of contours DO2 and PO2 of the targets DO and PO that are indicated by broken lines appearing to be deformed based on a distance to the own vehicle M0. However, in FIG. 8, for the purpose of showing the displacement of the changed pixels DO1 and PO1 relative to the own vehicle M0, the deformation of the contours DO2 and PO2 of the targets DO and PO is not shown.

As a result of the above-described concept, when the road-surface state is determined to be at least either of the protruding road surface and the recessing road surface, the road-surface state can be determined to be a frozen road. As a result of the relative displacement of the road-surface state relative to the moving vehicle being used in addition to the determination using the absolute displacement of the road-surface state, determination accuracy regarding the road-surface state being a frozen road can be improved.

In addition, when the road-surface state is a wet state, displacement accompanying flowing water does not manifest as the relative displacement of the road-surface state relative to the moving vehicle. Therefore, as a result of the relative displacement of the road-surface state relative to the moving vehicle being used, determination accuracy regarding the road-surface state being a wet road can be improved. the determination accuracy regarding the road-surface state being a wet road can be improved through use of the relative displacement of the road-surface state relative to the moving vehicle.

Furthermore, the determination that the road-surface state is a frozen road may be determined when the frozen road determination is continued over a distance that is prescribed in advance. Alternatively, the determination that the road-surface state is a frozen road may be performed taking into consideration features of road topography, such as an intersection or a north-side road surface, in which freezing easily occurs or a frozen road is easily formed.

(2) According to the above-described embodiments, any of the dry road, the wet road, and the frozen road is determined as the type of the road-surface state. However, as the type of the road-surface state, the determination as to whether the road-surface state is a sunken/raised road may be performed. As described with reference to FIG. 8, when the position of the changed pixel PO1 that corresponds to the target PO moves away from the own vehicle M0 as the own vehicle M0 moves, the road-surface state determination apparatus 100 determines the type of the road-surface state to be a protruding road surface.

When the position of the changed pixel DO1 that corresponds to the target DO moves closer to the own vehicle M0 as the own vehicle M0 moves, the road-surface state determination apparatus 100 determines the type of the road-surface state to be a recessed road surface. The road-surface state determination apparatus 100 can thereby determine whether the road surface is sunken or raised. In addition, the displacement of the changed pixel increases as the recessing portion or the protruding portion becomes larger. Therefore, the size of the recessing portion and the protruding portion can also be determined. As driving assistance regarding a sunken/raised road, processes such as a sunken portion or a raised portion being circumvented by steering assistance, and the speed of the own vehicle M0 being reduced by braking assistance or acceleration restriction can be performed.

(3) According to the above-described embodiments, the determination regarding a wet road and a frozen road is performed using displacement of flowing water and a flowing water layer. In this regard, the type of the road-surface state may also be determined by an absolute displacement of a target being acquired, the target being snow or sand on the road surface. Snow and sand on the road surface generally move in the horizonal direction as a result of wind or a travelling wind.

Therefore, when the road-surface state is determined to be a dry road at step S104 in FIG. 3, an amount of snow or sand on the road surface may be determined using the first detection signal that is outputted from the event camera 261, and determination of a snowfall road/snow-covered road or a sandy road may be performed as the type of the road-surface state. In this case, when the target is also displaced upward in the vertical direction, the target can be determined to be powder snow or fine sand.

A snowy road and a sandy road have a high degree of whiteness and may be determined to be a dry road by the camera 22. In addition, because the snowy road and the sandy road have a higher degree of whiteness than the dry road, upon the road-surface state being determined to be the snowy road or the sandy road, the determination as to whether the road-surface state is the snowy road or the sandy road can be performed using displacement characteristics of the target. The snowy road and the sandy road tend to be slippery. Therefore, as driving assistance for the snowy road and the sandy road, driving assistance such as the speed of the own vehicle M0 being suppressed by braking assistance or acceleration restriction, sudden acceleration and deceleration being suppressed, and the braking start timing being made earlier can be performed.

(4) According to the above-described embodiments, when the road-surface large flow rate flag WF=1 or when the road-surface deep water flag WD=1, the hydro flag HP is not 1. However, when WF=1 or WD=1, driving assistance such as switching to dry-keep in which a rotor surface is placed in a dry state by the brake apparatus 502 being periodically lightly operated or an anti-lock brake (ABS) setting that is operated at an early stage for a wet road, and notification to the driver may be performed. In addition, the hydro flag HP=1 may be set based only on a condition that WD=1.

(5) According to the above-described embodiments, the control unit that performs the driving assistance process and the road-surface state determination process by software is actualized by the CPU 101 running the driving assistance program Pr1 and the road-surface state determination program Pr1. However, the control unit may be actualized by hardware, by an integrated circuit or a discrete circuit that is programed in advance. That is, the control unit and a method thereof according to the above-described embodiments may be actualized by a dedicated computer that is provided so as to be configured by a processor and a memory, the processor being programmed to provide one or a plurality of functions that are realized by a computer program.

Alternatively, the control unit and the method thereof described in the present disclosure may be actualized by a dedicated computer that is provided by a processor being configured by a single dedicated hardware logic circuit or more. Still alternatively, the control unit and the method thereof described in the present disclosure may be actualized by a single dedicated computer or more, the dedicated computer being configured by a combination of a processor that is programmed to provide one or a plurality of functions, a memory, and a processor that is configured by a memory and a single hardware logic circuit or more. In addition, the computer program may be stored in a non-transitory tangible recording medium that can be read by a computer as instructions performed by the computer.

The present disclosure is described above based on the embodiments and variation examples. However, the above-described embodiments are provided to facilitate understanding of the present disclosure and do not limit the present disclosure. The present disclosure can be modified and improved without departing from the spirit and scope of claims of the disclosure. In addition, the present disclosure includes equivalents thereof. For example, embodiments that correspond to technical features in each aspect described in the summary of the invention and technical features in the variation examples can be replaced and combined as appropriate to solve some or all of the above-described issued or to achieve some or all of the above-described effects. Furthermore, the technical features may be omitted as appropriate unless described as a requisite in the present specification.

What is claimed is:

1. A road-surface state determination apparatus for a vehicle, comprising:
    an acquiring unit that acquires, as a first detection signal, information on a changed pixel of which a luminance value changes based on an absolute displacement of a road-surface state or a relative displacement of the road-surface state relative to a moving vehicle; and
    a control unit that determines a type of the road-surface state using the first detection signal, wherein:
    the control unit performs, using the first detection signal, a frequency analysis on displacement characteristics of the changed pixel in a horizontal direction of the road surface, and determines that the type is a wet road that has flow when an amplitude at a first frequency or lower is greater than a first amplitude.

2. A road-surface state determination apparatus for a vehicle, comprising:
    an acquiring unit that acquires, as a first detection signal, information on a changed pixel of which a luminance value changes based on an absolute displacement of a road-surface state or a relative displacement of the road-surface state relative to a moving vehicle; and
    a control unit that determines a type of the road-surface state using the first detection signal, wherein:
    the control unit performs, using the first detection signal, a frequency analysis on displacement characteristics of the changed pixel in a vertical direction of the road surface, and determines that the type is a wet road that is flooded when an amplitude at a second frequency or lower is greater than a third amplitude.

3. The road-surface state determination apparatus according to claim 1, wherein:

the control unit determines that the type is a frozen road when the amplitude at the first frequency or lower is equal to or less than a second amplitude that is less than the first amplitude.

4. The road-surface state determination apparatus according to claim 2, wherein:
the control unit further determines that the type is a frozen road when the amplitude at the second frequency or lower is equal to or less than the fourth amplitude that is less than the third amplitude.

5. The road-surface state determination apparatus according to claim 1, wherein:
the acquiring unit further acquires an imaging result of the road-surface state as a second detection signal; and
the control unit performs determination using the frequency analysis when the road-surface state is determined to be the wet state using the second detection signal.

6. The road-surface state determination apparatus according to claim 2, wherein:
the acquiring unit further acquires an imaging result of the road-surface state as a second detection signal; and
the control unit performs determination using the frequency analysis when the road-surface state is determined to be the wet state using the second detection signal.

7. The road-surface state determination apparatus according to claim 1, wherein:
the control unit determines the type of the road-surface state in an area of the road surface in which the changed pixel is present.

8. The road-surface state determination apparatus according to claim 2, wherein:
the control unit determines the type of the road-surface state in an area of the road surface in which the changed pixel is present.

9. A road-surface state determination method comprising:
acquiring, as a first detection signal, information on a changed pixel of which a luminance value changes based on an absolute displacement of a road-surface state or a relative displacement of the road-surface state relative to a vehicle; and
performing, using the first detection signal, a frequency analysis on displacement characteristics of the changed pixel in a horizontal direction of the road surface, and determining that the type is a wet road that has flow when an amplitude at a first frequency or lower is greater than a first amplitude.

10. A road-surface state determination method comprising:
acquiring, as a first detection signal, information on a changed pixel of which a luminance value changes based on an absolute displacement of a road-surface state or a relative displacement of the road-surface state relative to a vehicle; and
performing, using the first detection signal, a frequency analysis on displacement characteristics of the changed pixel in a vertical direction of the road surface, and determining that the type is a wet road that is flooded when an amplitude at a second frequency or lower is greater than a third amplitude.

* * * * *